United States Patent Office 3,524,854
Patented Aug. 18, 1970

3,524,854
HEXAMETHYLENETETRAMINE SALTS OF CYANOALKYL HALIDES
Stephen J. Kuhn, Sarnia, Ontario, Canada, assignor to The Dow Chemical Company, Midland, Mich., a corporation of Delaware
No Drawing. Filed Apr. 16, 1968, Ser. No. 721,581
Int. Cl. C07d 55/52
U.S. Cl. 260—248.5      3 Claims

ABSTRACT OF THE DISCLOSURE

The disclosure is directed to hexamethylenetetramine salts of haloorganic compounds of the group consisting of cyanoalkyl halides and cyanobenzyl halides and in particular, the hexamethylenetetramine salts of 4-bromobutyronitrile, 5-bromovaleronitrile, α-chloro-o-toluonitrile, α-chloro-m-toluonitrile and α-chloro-p-toluonitrile. The compounds of this disclosure are represented by the formula

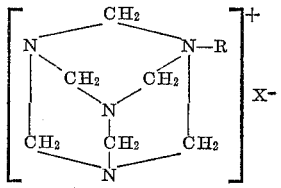

wherein R represents a cyanobenzyl radical or a cyanoalkyl radical of 3–10 carbon atoms and X represents bromine or chlorine. The method of preparation as well as the use of these compounds as bactericides and fungicides is taught.

BACKGROUND OF THE INVENTION

The prior art has taught somewhat related compounds to those of the present invention; however, these prior art compounds have not shown the utility as exhibited by the compounds of the present invention.

The prior art has taught hexamethylenetetramine salts of halogen compounds, for example, U.S. Pats. 2,798,871 and 3,228,829. These compounds differ from the salts of this invention and do not have the same properties thereof.

SUMMARY OF THE INVENTION

The hexamethylenetetramine salts of the invention are represented by the formula

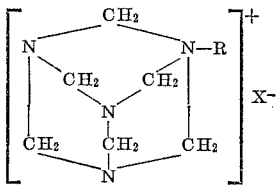

wherein R represents a cyanobenzyl radical or a cyanoalkyl radical of 3–10 carbon atoms and X represents bromine or chlorine. The novel compounds are prepared by the interaction of cyanoalkyl halides or cyanobenzyl halides and hexamethylenetetramine. The reaction proceeds when the reagents are intimately contacted, preferably in the presence of an inert solvent. In the formation of the novel hexamethylenetetramine salt, it is found that some of the desired product is obtained when the amine and halide are contacted in any proportions. Said reactants are preferably reacted in a 1:1 to 2:1 molar ratio of the halide to the amine. The reaction proceeds slowly at lower temperatures and preferred temperatures are between about 60° and 100° C. If the reaction is carried out above 100° C., dehydrohalogenation may occur. Therefore, the reaction mixture is preferably cooled to keep the temperature within the desired range during the reaction period. When the reaction is completed, the reaction mixture is filtered. A solid product is retained by the filter and is washed on the filter with boiling chloroform to remove any unreacted hexamethylenetetramine and then dried. The product, separated as described above, may be employed in bactericidal and fungicidal operations.

Representative salts of the invention are the hexamethylenetetramine salt of 4-bromobutyronitrile, the hexamethylenetetramine salt of 5-bromovaleronitrile, the hexamethylenetetramine salt of α-chloro-o-toluonitrile, the hexamethylenetetramine salt of α-chloro-m-toluonitrile and the hexamethylenetetramine salt of α-chloro-p-toluonitrile.

In the preparation of the hexamethylenetetramine salts of the invention, one to two molar proportions of either a cyanoalkyl or cyanobenzyl halide are added to an inert solvent, preferably chloroform, although other chlorinated or brominated hydrocarbon solvents can also be employed. To this mixture is added approximately one molar proportion of hexamethylenetetramine. A reaction occurs and the reaction mixture is maintained at a temperature between about 60° and 100° C. The reaction mixture is maintained at the reaction temperature until the reaction is complete, usually from about 1 to about 8 hours When the reaction is complete, the hot mixture is filtered and a solid remains on the filter. This solid is then washed with boiling chloroform to remove any unreacted hexamethylenetetramine. Any unchanged halides can be separated from the effluent of the reaction by evaporating the chloroform therefrom. While hot chloroform will dissolve the reactants, the amine salt produced is not very soluble therein, making the separation of the products relatively easy.

DESCRIPTION OF SOME PREFERRED EMBODIMENTS

The following examples illustrate the present invention but are not to be construed as limiting the same.

EXAMPLE 1

Hexamethylenetetramine salt of 4-bromobutyronitrile

In representative operations, 30 grams (0.2 mole) of 4-bromobutyronitrile, 13.8 grams (0.1 mole of hexamethylenetetramine and 100 milliliters of chloroform were placed into a 250 milliliter boiling flask and the mixture was refluxed for two hours on a steam bath. The product precipitated from the solution as it was formed. When the reaction was complete, the hot mixture was filtered and the solid on the filter was washed five times with 30-milliliter portions of boiling chloroform. The white solid hexamethylenetetramine salt of 4-bromobutyronitrile product was dried in an oven at 60° C. The product was obtained in a yield of 25.0 grams (87 percent), had a melting point of 155°–156° C., a molecular weight of 288 and was found by analysis to have carbon, hydrogen and nitrogen contents of 41.5, 6.3 and 24.44 percent, respectively, as compared with the theoretical contents of 41.7, 6.3 and 24.3 percent, respectively, calculated for the above-named structure.

EXAMPLE 2

Hexamethylenetetramine salt of 5-bromovaleronitrile 32.8 grams (0.2 mole) of 5-bromovaleronitrile and 13.8 grams (0.1 mole) of hexamethylenetetramine were placed in a 250 milliliter round-bottom flask. 75 milliliters of chloroform were added and the reaction mixture was refluxed for three hours. The hot mixture was filtered and the solid retained on the filter was washed five times with 25-milliliter portions of boiling chloroform. The white crystalline hexamethylenetetramine salt of 5-bromovaleronitrile product was dried in an oven at 60° C. This product was obtained in a yield of 23.4 grams (78 percent), had a melting point of 153°–156° C. and a molecular weight of 302.

EXAMPLE 3

Hexamethylenetetramine salt of α-chloro-o-toluonitrile 22.6 grams (0.15 mole) of α-chloro-o-toluonitrile, 13.8 grams (0.1 mole) of hexamethylenetetramine and 200 milliliters of chloroform were placed into a 500 milliliter boiling flask and the mixture was refluxed for four hours. A solid precipitate was formed and the hot reaction mixture was filtered to recover this solid product. The solid product was washed four times on the filter with 30-milliliter portions of boiling chloroform and dried in an oven at 60° C. The hexamethylenetetramine salt of α-chloro-o-toluonitrile product was obtained in a yield of 24 grams (83 percent), had a melting point of 178° C., a molecular weight of 291 and was found by analysis to have carbon, hydrogen and nitrogen contents of 57.3, 6.21 and 23.8 percent, respectively, as compared with the theoretical contents of 57.6, 6.22 and 24.0 percent, respectively, calculated for the named structure.

EXAMPLE 4

Hexamethylenetetramine salt of α-chloro-m-toluonitrile 22.6 grams (0.15 mole) of α-chloro-m-toluonitrile, 13.8 grams (0.1 mole) of hexamethylenetetramine and 200 milliliters of chloroform were placed into a 500 milliliter boiling flask and the mixture was refluxed for four hours. A solid precipitate was formed and the hot reaction mixture was filtered to recover this solid product. The solid hexamethylenetetramine salt of α-chloro-m-toluonitrile product was washed four times on the filter with 30-milliliter portions of boiling chloroform and dried in an oven at 60° C. The product was obtained in a yield of 26.3 grams (91.1 percent), had a melting point of 183° C., a molecular weight of 291 and was found by analysis to have a carbon, hydrogen and nitrogen content of 57.4, 6.32 and 24.2 percent, respectively, as compared with the theoretical content of 57.6, 6.22 and 24.00 percent, respectively, calculated for the named structure.

EXAMPLE 5

Hexamethylenetetramine salt of α-chloro-p-toluonitrile 22.6 grams (0.15 mole) of α-chloro-p-toluonitrile, 13.8 grams (0.1 mole) of hexamethylenetetramine and 200 milliliters of chloroform were placed into a 500 milliliter boiling flask and the mixture was refluxed for four hours. A solid precipitate was formed and the hot reaction mixture was filtered to recover this solid product. The solid hexamethylenetetramine salt of α-chloro-p-toluonitrile product was washed four times on the filter with 30-milliliter portions of boiling chloroform and dried in an oven at 60° C. The product was obtained in a yield of 26.3 grams (91.1 percent), had a melting point of 175°–180° C., a molecular weight of 291 and was found by analysis to have a carbon, hydrogen and nitrogen content of 57.3, 6.1 and 24.2 percent, respectively, as compared with the theoretical content of 57.6, 6.22 and 24.0 percent, respectively, calculated for the named structure.

In the same manner as above, other salts are prepared as follows:

Hexamethylenetetramine salt of 10-chlorodecanonitrile, having a molecular weight of 327, prepared by the reaction of hexamethylenetetramine and 10-chlorodecanonitrile in chloroform.

Hexamethylenetetramine salt of 3-chloropropionitrile, having a molecular weight of 229, prepared by the reaction of hexamethylenetetramine and 3-chloropropionitrile in chloroform.

Hexamethylenetetramine salt of α-bromo-m-toluonitrile, having a molecular weight of 336, prepared by the reaction of hexamethylenetetramine and α-bromo-m-toluonitrile in chloroform.

The cyanoalkyl halides used as starting materials may be prepared by the dehydration of the corresponding amides or by the partial halogen exchange of the corresponding dihalo compound with potassium cyanide. The cyanobenzyl halides are prepared by the halogenation of the corresponding toluonitrile in the presence of the corresponding phosphorus pentahalide. The techniques for the preparation of the above compounds are conventional in the art.

The hexamethylenetetramine salts of the invention are employed as toxicants in bactericides and fungicides. For such uses, the compounds can be employed in an unmodified form or dispersed on a finely divided solid and employed as a dust. Such mixtures can also be dispersed in water with or without the aid of a surface-active agent and the resulting aqueous suspension employed as a spray. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

In representative operations, the above described hexamethylenetetramine salts were separately dispersed in portions of melted nutrient agar to produce a series of culture media each containing 0.075 percent of one of the test compounds by weight as the sole toxicant therein. Each of these media was then poured into separate petri dishes and allowed to solidify. A check medium was also prepared employing the nutrient agar containing none of the toxicants. The solidified agar surface in each petri dish was inoculated with test bacterial and fungal organisms.

In such operations, each of the compounds, hexamethylenetetramine salt of α-chloro-o-toluonitrile, hexamethylenetetramine salt of α-chloro-m-toluonitrile, hexamethylenetetramine salt of α-chloro-p-toluonitrile, hexamethylene tetramine salt of 4-bromobutyronitrile and hexamethylenetetramine salt of 5-bromovaleronitrile, was found to give complete inhibition and control of each of the organisms *Aerobacter aerogenes, Aspergillus terreus, Bacillus subtilis, Candida pelliculosa, Pseudomonas aeruginosa, Pullularia pullulans, Salmonella typhosa* and *Staphylococcus aureus*. At the time of observation, the check medium was found to support vigorous growth of each of the named organisms. In further operations carried out in exactly similar fashion to the above, each of hexamethylenetetramine salt of 4 - bromobutyronitrile, hexamethylenetetramine salt of α-chloro-m-toluonitrile and hexamethylenetetramine salt of 5-bromovaleronitrile was found to give complete inhibition and control of the organisms *Escherichia coli* and *Trichophyton mentagrophytes*.

What is claimed is:

1. A hexamethylenetetramine salt corresponding to the formula

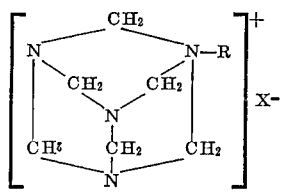

wherein R represents a cyanoalkyl radical of 3–10 carbon atoms and X represents bromine or chlorine.

2. A salt of claim 1 wherein the salt is the hexamethylenetetramine salt of 4-bromobutyronitrile.

3. A salt of claim 1 wherein the salt is the hexamethylenetetramine salt of 5-bromovaleronitrile.

References Cited

UNITED STATES PATENTS 2,798,871    7/1957    Bloom et al. _____ 260—248.5
3,228,829    1/1966    Wolf et al. ____ 260—248.5 XR

OTHER REFERENCES

Jacobs et al., J. Biological Chem., vol. 20, pp. 659–67 (1915).

JOHN D. RANDOLPH, Primary Examiner

J. M. FORD, Assistant Examiner

U.S. Cl. X.R.

260—999